Figure 11:
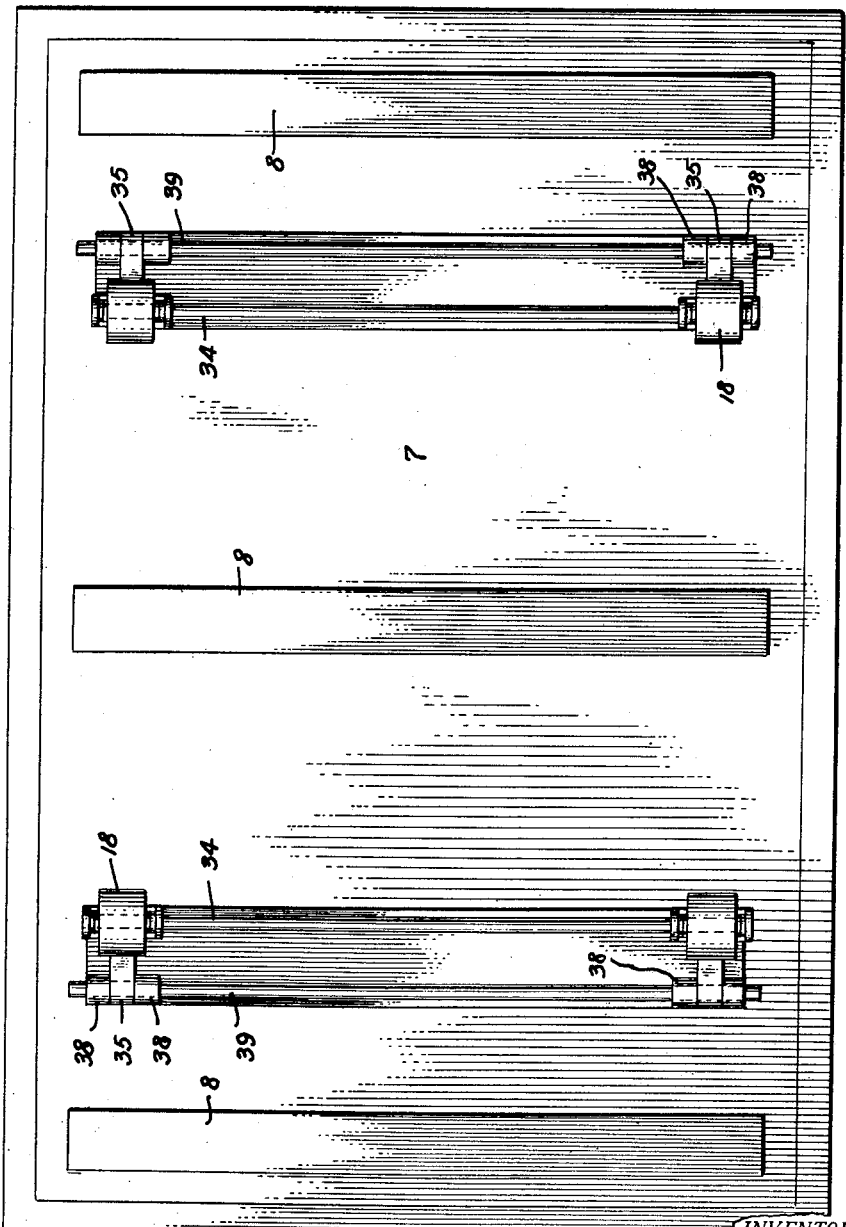

Nov. 26, 1957 F. R. HULL 2,814,498
RETRACTIBLE CARRIAGE MOUNTING
Filed June 27, 1955 4 Sheets-Sheet 1
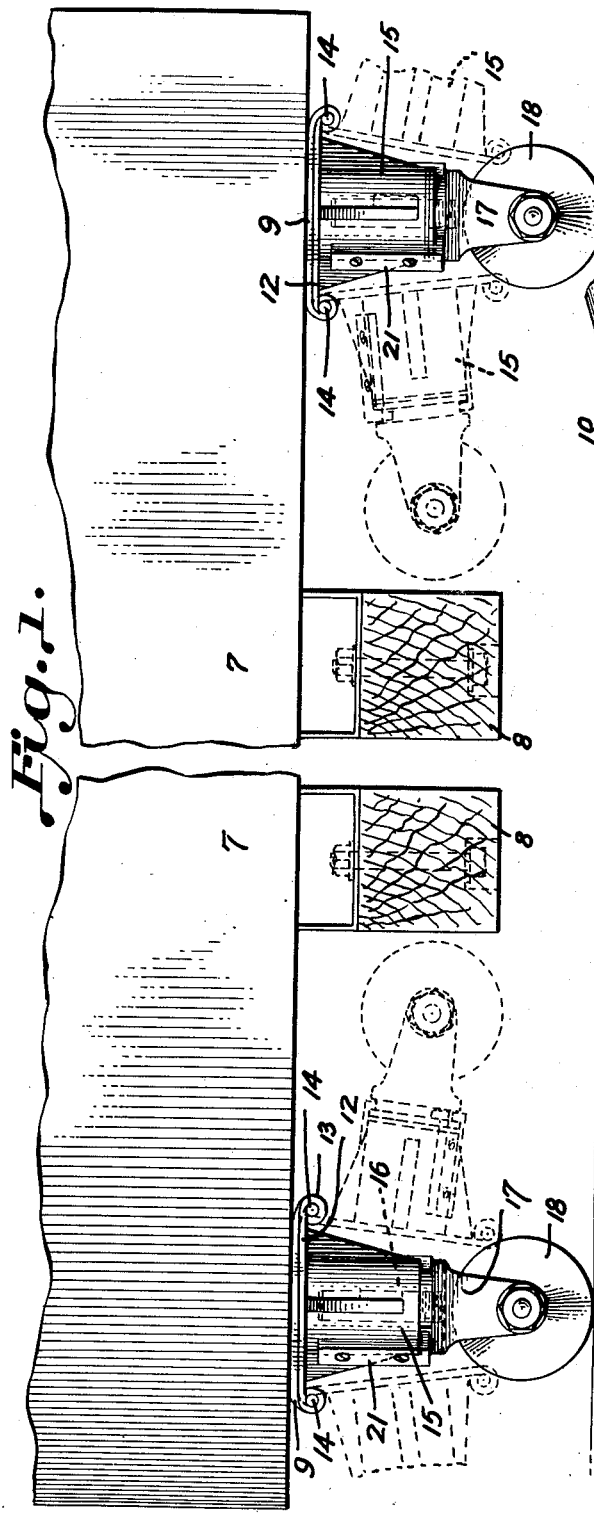
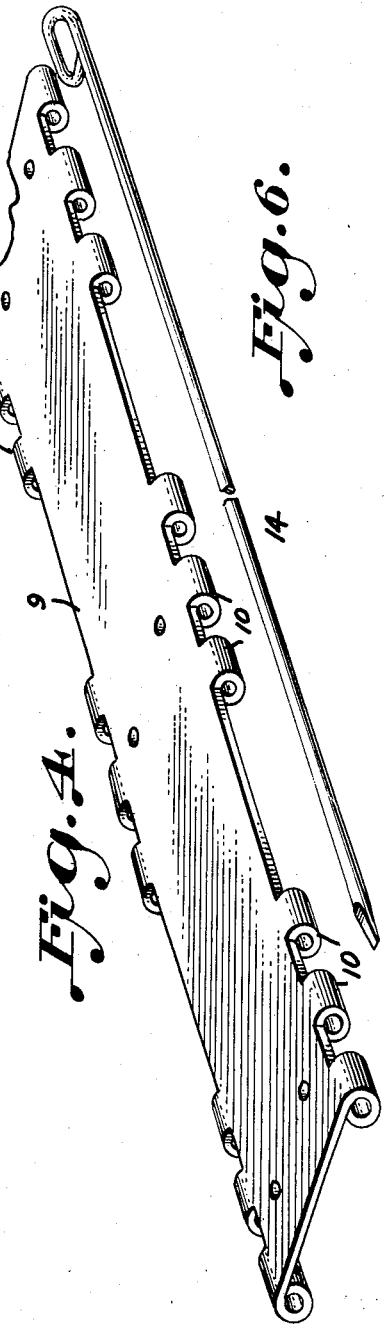
INVENTOR.
Francis R. Hull,
BY
ATTY.

Nov. 26, 1957 — F. R. HULL — 2,814,498
RETRACTIBLE CARRIAGE MOUNTING
Filed June 27, 1955 — 4 Sheets-Sheet 2
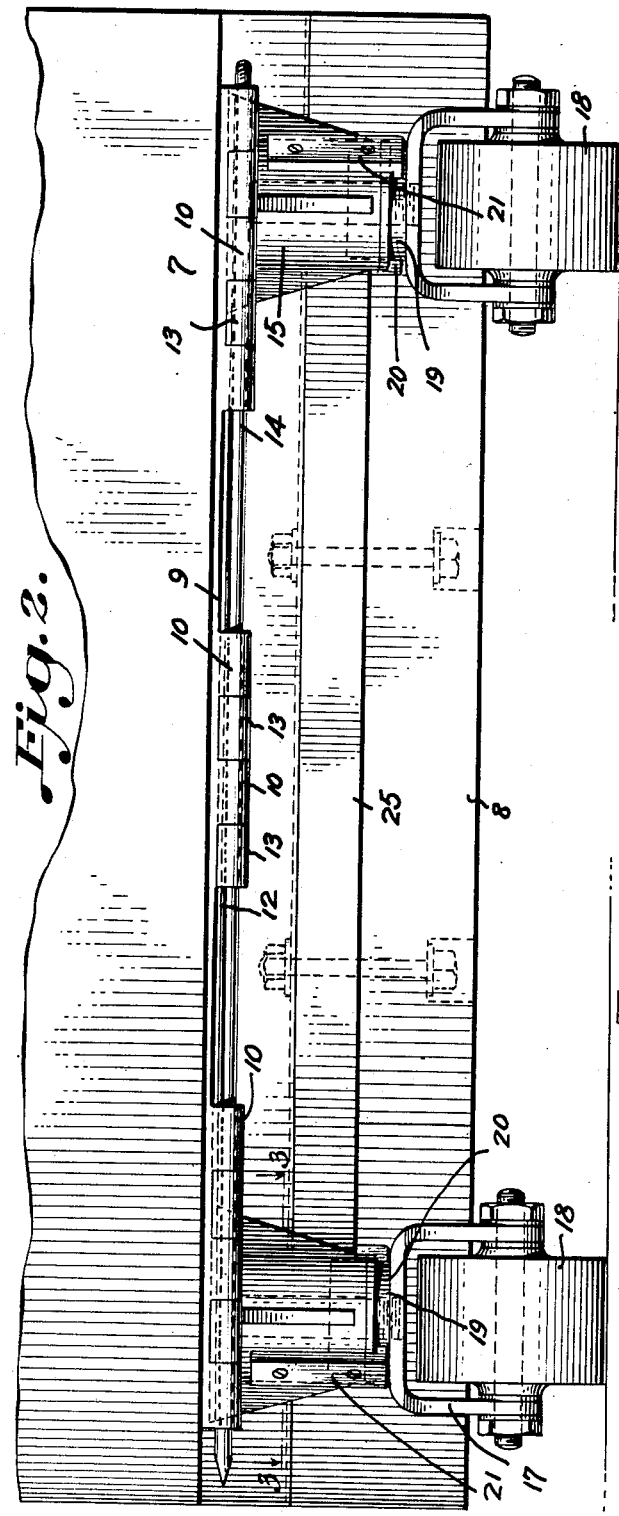
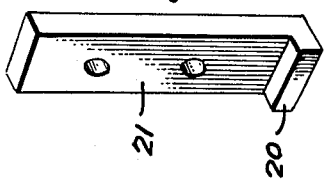
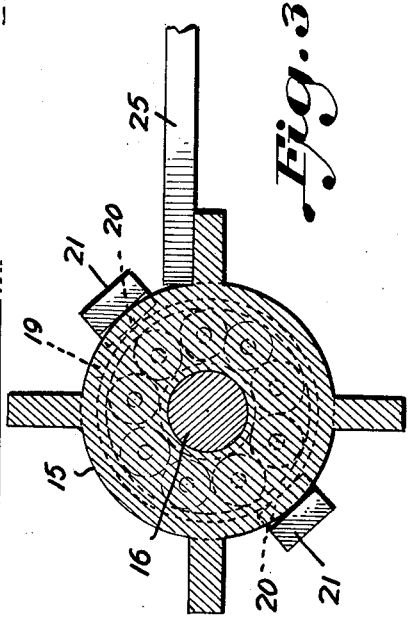
INVENTOR.
Francis R. Hull,
BY
ATTY.

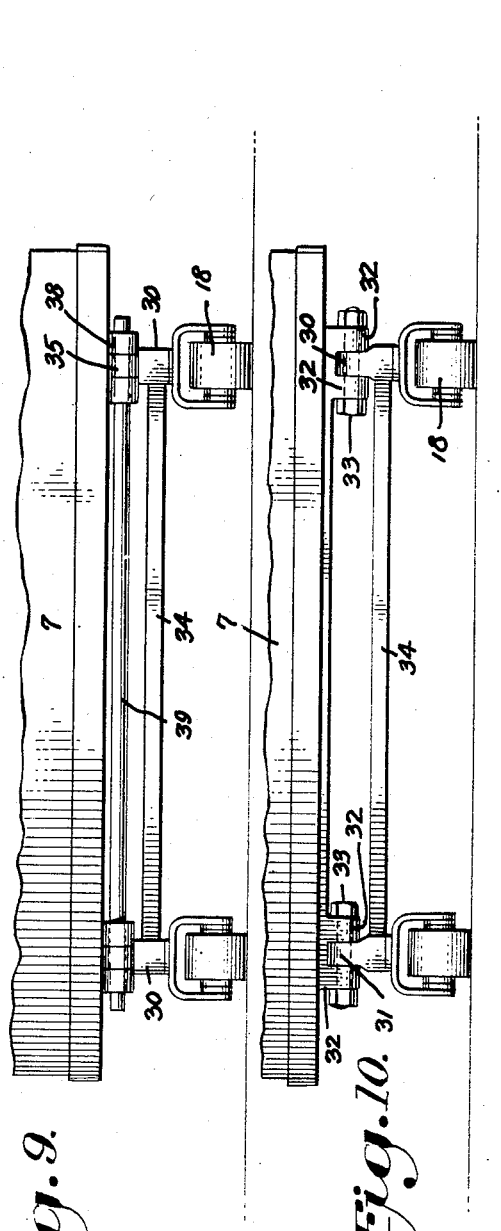

Nov. 26, 1957  F. R. HULL  2,814,498
RETRACTIBLE CARRIAGE MOUNTING
Filed June 27, 1955  4 Sheets-Sheet 4

INVENTOR.
Francis R. Hull,
BY
ATTY.

United States Patent Office 2,814,498
Patented Nov. 26, 1957

2,814,498

RETRACTIBLE CARRIAGE MOUNTING

Francis R. Hull, Macungie, Pa.

Application June 27, 1955, Serial No. 518,097

3 Claims. (Cl. 280—43)

This invention is a retractible carriage mounting, applicable either to boxes or cases to contain goods or merchandise, capable of supporting the load for movement over a supporting surface and also capable of being readily retracted when the load has reached a predetermined location in order that the container may rest solidly and firmly upon its supporting sills.

The primary object of the invention is to provide a retractible carriage mounting constructed as an attachment either to a vehicle or a case or container, which involves but few simple and readily assembled parts, which when properly applied permits the load to be readily maneuvered over a supporting surface, and which involves means of simple nature whereby the carriage members may be swung out of engagement with the ground or supporting surface to allow the load to rest upon its sills.

A further object of the invention is to provide a carriage mounting so constructed that the frame carrying the supporting rollers may be swung out of engagement with the ground or supporting surface either forwardly or rearwardly of the load as occasion may require, thus to enable the operators to more quickly and conveniently move the retractible carriage to inoperative position.

With the foregoing objects in view, together with others which will appear as the description proceeds, the invention consists in the novel construction, combination and arrangement of parts, all as will be described more fully hereinafter, illustrated in the drawing, and particularly pointed out in the claims.

In the drawing:

Fig. 1 is a side elevation of a conventional form of carrier, either box, van or carriage, showing a retractible carriage apparatus applied thereto, Fig. 2 is an end view of the container and carriage structure, Fig. 3 is a transverse fragmentary sectional view, on an enlarged scale, taken substantially upon line 3—3 of Fig. 2, Fig. 4 is a perspective view of one of the securing plates, Fig. 5 is a similar view of one of the retention brackets, and Fig. 6 is a perspective view of a latching pin used in connecting the base plate and the retractible carriage structure.

Fig. 7 is a side elevation of a conventional form of carrier, box or carriage, showing a retractible carriage apparatus involving a slight modification of the invention, Fig. 8 is a similar view showing the supporting wheels in the position they will assume when the structure is at rest upon its sills, Fig. 9 is a front elevation of the device as shown in Fig. 7, Fig. 10 is a view similar to Fig. 9 and showing the hinge connection between the caster standards and the bottom of the container or vehicle, and Fig. 11 is a bottom plan view of the vehicle structure disclosing the invention as shown in Fig. 7.

The present inventive development may be applied either to heavy boxes, crates, vans and other storage receptacles, or may be attached to a carriage for the support of heavy loads to enable the same to be readily and easily maneuvered into desired positions, after which the apparatus is operated to release the weight of the container from the mobile structure and enable the same to rest securely and firmly upon its supporting sills.

In the drawing, 7 represents generally the body to be supported, whether it be a box, crate or carriage. This body is supplied with the usual spaced depending supporting sills 8 firmly secured to the bottom of the container 7.

The carriage mounting includes a pair of spaced supporting rollers or casters arranged at each end upon the underside of the container 7. The mounting includes a base plate 9 disposed transversely of the container or carriage 7 near each end and transversely thereof, the said plate being rigidly secured in position upon the container or carriage in any desired manner. Each plate is provided at its longitudinal edges with spaced hinge pintles 10.

Associated with each base plate is a hinge plate indicated at 12. The hinge plate is formed of substantial metal, corresponding generally in length and breadth with the base plate and is provided in its longitudinal edges with spaced hinge pintles 13 to cooperate or interfit with the pintles 10 of the base plate. The cooperating pintles 10 and 13 are maintained in assembled relationship by elongated hinge pins 14.

Each of the hinge plates is provided at its opposite ends with posts 15 having a central aperture in which is rotatably mounted the shaft 16 of a caster yoke 17, each of the yokes having rotatably mounted therein supporting wheels or rollers 18. Each yoke is provided with an annular groove or channel 19 to receive the tongue 20 of a retention bracket 21 rigidly secured to the post 15. By this arrangement it is apparent that the caster shaft 16 will have free rotative movement with respect to the post 15, and if desired, suitable roller bearings may be arranged in the post to enhance free rotative movement of the caster bracket, as shown in Fig. 3.

It will be observed, particularly with reference to Fig. 1, that the overall length of the caster post and its wheel 18 exceeds the depth of the sills 8, so that when in upright or projected position, the caster wheels 18 will rest upon the supporting surface beyond the plane of the lower or bearing surfaces of the sills 8, as shown in full lines in Fig. 1 of the drawings. However, when either of the hinge pins 14 is withdrawn from the registering pintles 10—13, the hinge plate is free to swing upon the remaining hinge pin to retracted position, permitting the body 7 to rest upon its supporting sills 8, the lateral dimension of the caster post being either equal to or less than the depth of the supporting sills.

In operating the device constructed in accordance with the invention, when it is desired to move the loaded vehicle or body 7, ordinary lifting jacks (not shown) are placed beneath the body 7 and the latter is raised thereby lifting the same and its supporting sills from engagement with the supporting surface. When the body 7 has been raised sufficiently far, the retracted supporting wheels will automatically move to vertical or the full line position shown in Fig. 1, whereupon the hinge pins 14 are inserted in the registering hinge pintles. When this operation has been carried out at each end of the body or vehicle 7, the latter may be freely maneuvered or rolled to its desired position for storage, loading or unloading. When it is desired to store the vehicle in its selected position, the lifting jacks are applied to each end of the vehicle and the latter is raised off of its supporting rollers 18, after which one or the other of the hinge pins at each end of the body is withdrawn, permitting the caster structures to be swung to retracted or inoperative positions (in either direction), after which the jacks are operated to lower the body until the lower surfaces of the sills engage with the supporting surface. The hinge plates, being provided with removable hinge pins at each of their longitudinal edges, enable the roller yokes to be swung either inwardly or outwardly of the vehicle body as may be desired by the operator. The caster structures may in this manner be easily and quickly swung in either direction to projected or operative position or to retracted or inoperative position. When projected, the structure firmly supports the load to which it is subjected, and spreader bars 25 may be employed to connect the caster posts 15 of each pair and thus lend rigidity to the structure.

Figs. 7 to 11 inclusive, show a modified form of the invention, wherein caster standards 30, arranged in pairs at each end of the container or vehicle, are provided at their upper ends with pintles 31 to cooperate with similar pintles 32 secured to either the bottom of the container or vehicle 7 and depending therefrom near the sides of the body and in lateral alignment. These registering pintles are connected by hinge bolts or pins 33 to permit the caster standards to swing relative to the vehicle body. These standards are connected by the cross bar or strut 34 so that the casters at each end of the vehicle may swing as a unit.

Each of the standards 30 is provided with a substantially right angular extending arm 35 disposed lengthwise of the body or vehicle 7, which arms are provided with openings 36 to register with openings 37 in pintles 38 depending from the bottom of the body 7. An elongated pin 39 extends transversely of the vehicle and through the registering openings 36 and 37 in the arm and body pintles 35—38 to maintain the standards in raised or extended position as shown in Figs. 7 and 9.

Assuming the parts to be in the positions as shown in Fig. 7, when it is desired that the body 7 be rested upon its sills 8, lifting jacks are placed beneath the vehicle body and operated to lift the latter sufficiently for the caster rollers 18 to clear the floor or supporting surface. The pins 39 are then withdrawn, after which the jacks are operated to lower the body 7, whereupon the caster units swing upon their pivot bolts 33 to the position shown in Fig. 8 permitting the body 7 to rest upon its supporting sills 8. When it is desired to move the body 7, the reverse of this procedure is carried out.

From the foregoing, it is apparent that I have provided comparatively simple and yet most efficient means for bringing about extension or retraction of the roller supports, to permit of such maneuverability of the container or carriage 7 as may be desired, and to enable the same to be easily and quickly brought to rest in the desired location upon its supporting sills without danger of harm or injury either to the vehicle or case or to the contents thereof.

I claim:

1. A retractible carriage for containers having supporting sills depending therefrom, a plate hingedly connected at one edge to the bottom of said container and disposed transversely thereof, a loop member at the opposite edge of said plate, pintles secured to the bottom of said container normally in register with said loop member, a pin passing through said loop member and said hinge pintles to maintain said plate in parallelism with said container bottom, and supporting rollers secured to and depending from said plate at right angles thereto and in spaced relationship, the bearing surfaces of said rollers disposed in a plane below the plane of the supporting surfaces of said sills.

2. A retractible carriage for containers having supporting sills depending therefrom, a hinge base secured to the bottom of said carriage and disposed transversely thereof, hinge pintles at the longitudinal edges of said base, a hinge plate corresponding substantially with the length and breadth of said base, pintles at the longitudinal edges of said hinge plate, pins extending through the pintles of said base and plate, posts rigidly connected to said hinge plate at each end thereof and disposed at substantially right angles thereto, a caster wheel rotatably mounted in each of said posts, and the distance between the base of each post and the supporting surface of its caster wheel being greater than the depth of said sills.

3. A retractible carriage for containers having supporting sills depending therefrom, a pair of caster standards arranged in spaced parallelism adjacent to each end of said container and disposed transversely thereof, pivots connecting the upper ends of said caster standards to the bottom of said container, arms projecting outwardly from said standards near the upper ends thereof, said arms having transverse apertures therein disposed parallel to said pivots, pintles depending from the bottom of said container to receive the apertured ends of said arms, and pins passing through said apertures and pintles to maintain said standards against swinging movement beneath said container.

References Cited in the file of this patent

UNITED STATES PATENTS

| | | |
|---|---|---|
| 435,473 | Wright | Sept. 2, 1890 |
| 1,014,440 | Benskin | Jan. 9, 1912 |
| 1,058,837 | Zikmund | Apr. 15, 1913 |
| 1,812,890 | McWhorter | July 7, 1931 |
| 1,884,636 | Faus | Oct. 25, 1932 |
| 2,572,348 | Johnson | Oct. 23, 1951 |
| 2,663,048 | Ross | Dec. 22, 1953 |